(12) United States Patent
Acosta et al.

(10) Patent No.: US 6,332,577 B1
(45) Date of Patent: Dec. 25, 2001

(54) SYSTEM AND METHOD FOR CONVERTING MULTIPLE BEAM OPTICAL SCANNER

(75) Inventors: Jorge L. Acosta; Robert W. Rudeen, both of Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/702,048

(22) Filed: Oct. 30, 2000

Related U.S. Application Data

(63) Continuation-in-part of application No. 09/360,039, filed on Jul. 23, 1999.

(51) Int. Cl.[7] .................................................. G06K 7/10
(52) U.S. Cl. ............................... 235/472.01; 235/462.39
(58) Field of Search ........................... 235/472.01, 462.39

(56) References Cited

U.S. PATENT DOCUMENTS

| | | |
|---|---|---|
| 4,591,242 | 5/1986 | Broockman et al. . |
| 4,678,288 | 7/1987 | Lonsdale et al. . |
| 4,694,182 | 9/1987 | Howard . |
| 4,786,798 | 11/1988 | Lonsdale . |
| 5,007,691 | 4/1991 | Bobba et al. . |
| 5,361,158 | 11/1994 | Tang . |
| 5,457,308 | 10/1995 | Spitz et al. . |
| 5,475,207 | 12/1995 | Bobba et al. . |
| 5,491,328 | 2/1996 | Rando . |
| 5,565,668 | 10/1996 | Redderson et al. . |
| 5,693,930 | 12/1997 | Katoh et al. . |
| 5,719,385 | 2/1998 | Wike, Jr. et al. . |
| 5,841,121 | 11/1998 | Koenck . |
| 5,869,827 | 2/1999 | Rando . |
| 5,945,670 | 8/1999 | Rudeen . |
| 6,189,795 | * 2/2001 | Ohkawa et al. ................ 235/462.39 |

FOREIGN PATENT DOCUMENTS 36 09 669    * 10/1986   (DE) .

* cited by examiner

Primary Examiner—Harold I. Pitts
(74) Attorney, Agent, or Firm—Lyon & Lyon LLP (57) ABSTRACT

A system for and a method of optical scanning which provide for converting between a multiple beam and a single beam optical scanner. In a preferred configuration, the scanner can be adapted to operate as either a single beam scanning system or a multiple beam scanning system. Light sources, mirrors, detectors, collection lenses, and other scanner components are added, removed, and/or replaced, thereby allowing the user to avoid having to purchase a new scanner when the user's performance requirements and/or cost restrictions vary.

25 Claims, 9 Drawing Sheets

SYSTEM AND METHOD FOR CONVERTING MULTIPLE BEAM OPTICAL SCANNER

RELATED APPLICATION DATA

This application is a continuation-in-part of application Ser. No. 09/360,039 filed Jul. 23, 1999.

BACKGROUND OF THE INVENTION

The field of the present invention relates to data reading systems. In particular, an optical scanning system and method for converting between multiple and single beam optical scanners are described herein.

U.S. application Ser. No. 09/360,039 to Acosta and Rudeen discloses various multiple beam scanner configurations. In one configuration, multiple laser beams are formed and directed along offset paths onto a scanning mechanism such as a polygon mirror which scans the beams across pattern mirrors to generate simultaneous scan patterns out into a scan volume. Return light from both scan patterns is retrodirectively collected and redirected by a common collection element such as a collection lens. The collection lens focuses return light from the first beam onto a first detector and return light from the second beam onto a second detector. By arranging the outgoing beam paths in an offset condition, the collected light may be focused to different locations.

Though the multiple beam system provides a high density and efficient scan pattern generation as well as a versatile scan system, the present inventors have recognized that increasing scan pattern density and scanner versatility can add to the cost of the scanner, thus, it may be advantageous to have a scanner that can be converted from a multiple beam system to a single beam system, or, alternatively, to have a scanner that can be converted from a single beam system to a multiple beam system.

SUMMARY OF THE INVENTION

The present invention is directed to a system for and a method of optical scanning which provide for converting between a multiple beam and a single beam optical scanner.

In a preferred configuration, the scanner can be adapted to operate as either a single beam scanning system or a multiple beam scanning system. Light sources, mirrors, detectors, collection lenses, and other scanner components are added, removed, and/or replaced, thereby allowing the user to avoid having to purchase a new scanner when the user's performance requirements and/or cost restrictions vary.

If it is determined that a single beam system would be preferred, second beam optics can be removed from the multiple beam scanning system along with removal or replacement of the corresponding components. For example, when the need for cost savings outweighs the need for enhanced performance, the additional components associated with a multiple beam scanner can be removed from the scanning system so that a single beam system is utilized.

Conversely, when it is determined that multiple beam optics are required to meet performance requirements, second beam optics can be added to the single beam scanner along with any corresponding components required to implement the multiple beam system.

DETAILED DESCRIPTION OF THE PREFERRED EMBODIMENTS

Preferred embodiments will now be described with reference to the drawings. To facilitate description, any reference numeral representing an element in one figure will represent the same element in any other figure.

Figure 1:
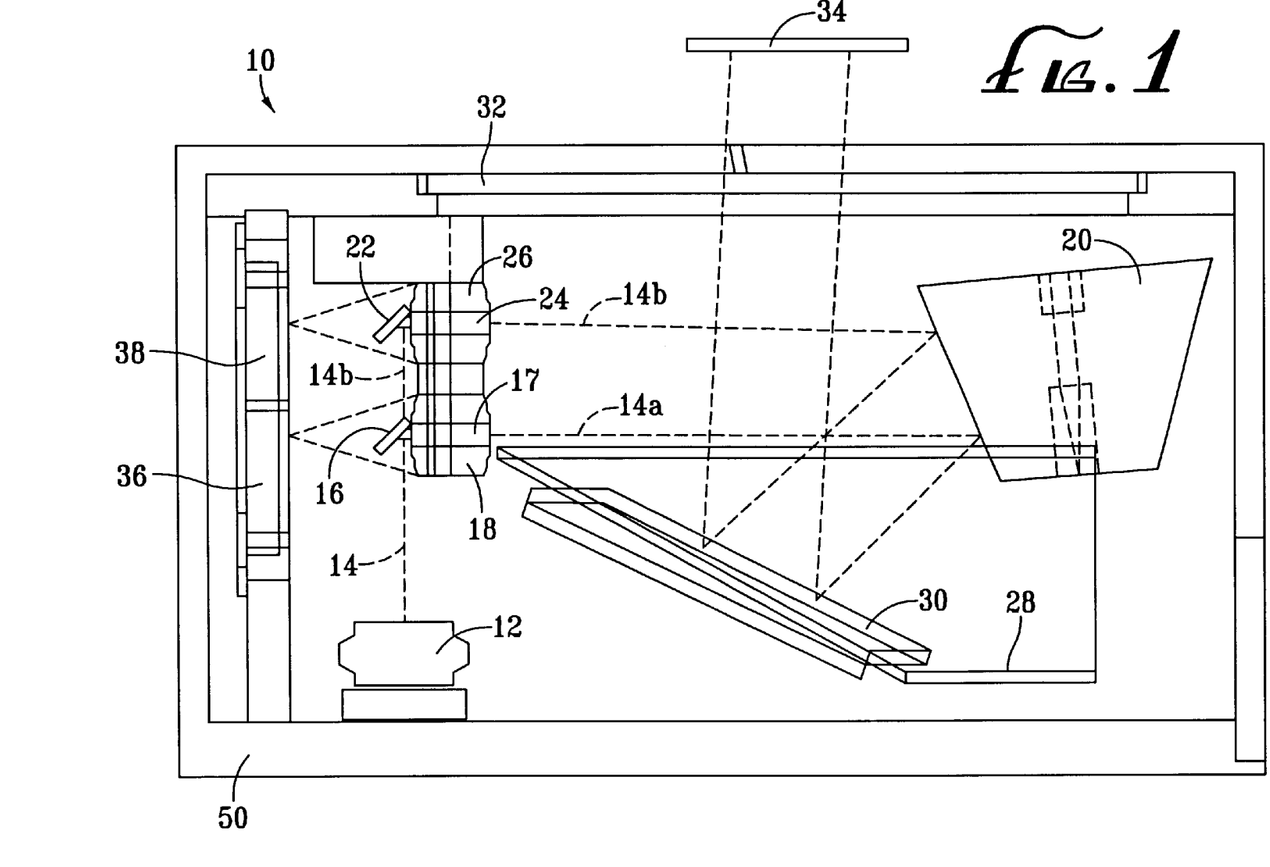
FIG. 1 is a diagrammatic view of a multiple beam scanning system according to a first preferred embodiment.

FIG. 1 illustrates a first preferred embodiment of a multiple beam optical scanning system 10 inside a housing 50. In scanning system 10, a light source 12, such as a visible laser diode (VLD), produces a laser beam 14 which is split by a beam splitter 16. The beam splitter 16 divides the beam 14 by reflecting a portion of the beam to generate a first light beam 14a and transmitting a second portion of the beam to generate a second light beam 14b. The first light beam portion 14a reflected by the beam splitter 16 is directed through a channel 17 in lower collection lens 18 and onto a polygon mirror 20. The second light beam portion 14b passing through the beam splitter 16 is reflected by fold mirror 22 and directed through a channel 24 in upper collection lens 26 and onto the polygon mirror 20.

The light beams 14a, 14b are scanned by the polygon mirror 20 across a plurality of pattern mirrors 28, 30 which direct the light beams 14a, 14b out through a window 32 and onto a target 34. Return light from the first light beam 14a is retrodirectively collected by the lower collection lens 18, which focuses the return light onto a first detector 36 bypassing the beam splitter 16. Return light from the second light beam 14b is retrodirectively collected by upper collection lens 26, which focuses the return light onto a second detector 38 bypassing the fold mirror 22. The detectors 36, 38 detect the return light and generate corresponding electrical signals that are processed by a processing system.

Figure 2:
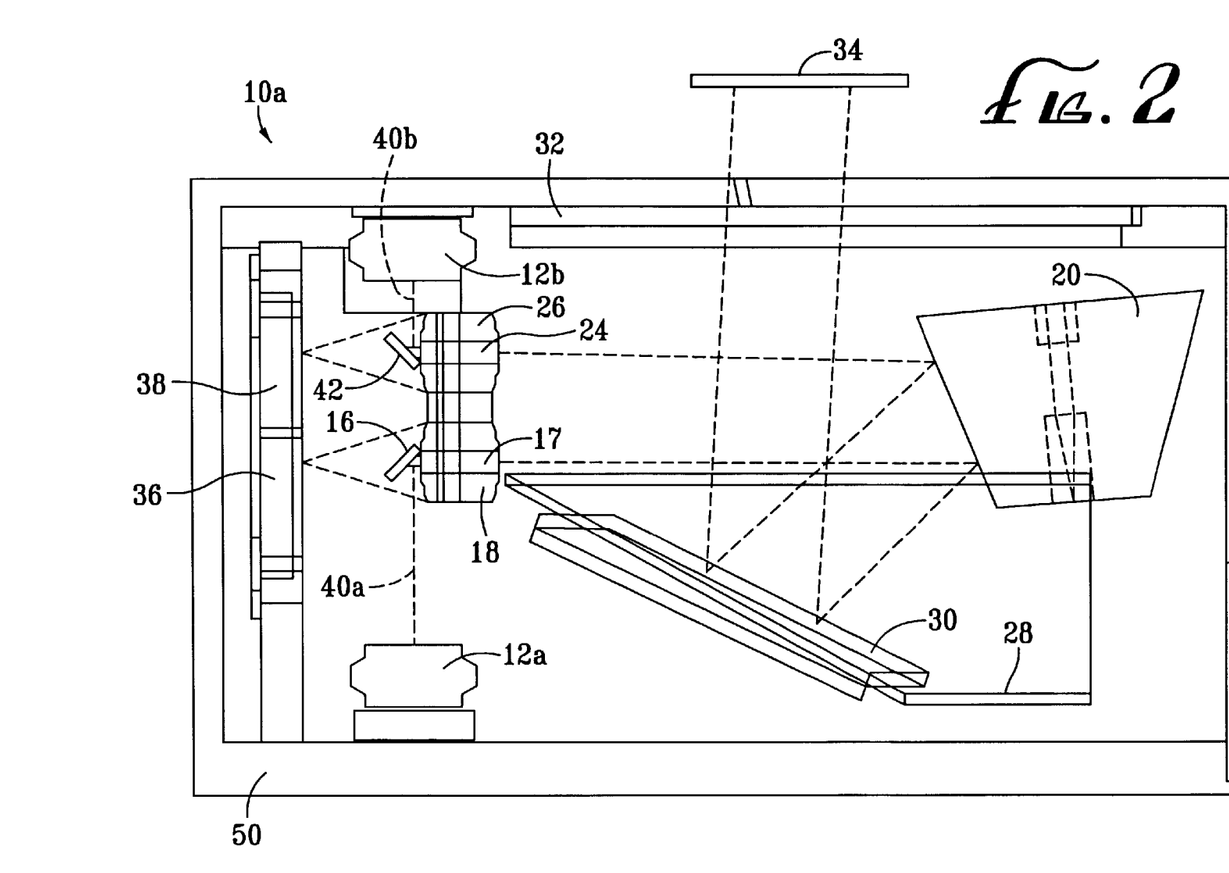
FIG. 2 is a diagrammatic view of a multiple beam scanning system according to a second embodiment.

FIG. 2 illustrates an alternative embodiment of a multiple beam optical scanning system 10a utilizing separate beam sources to generate multiple light beams, such as two laser diodes (VLDs), instead of utilizing a beam splitter. A first light source 12a generates a light beam 40a which is directed onto fold mirror 19. Fold mirror 19 reflects light beam 40a through a channel 17 in collection lens 18 and onto polygon mirror 20. A second light source 12b generates a light beam 40b which is directed onto fold mirror 42. Fold mirror 42 reflects light beam 40b through channel 24 in collection lens 26 and onto polygon mirror 20.

The light beams 40a, 40b are scanned by the polygon mirror 20 across a plurality of pattern mirrors 28, 30 which direct the light beams 40a, 40b out through window 32 and onto target 34. Return light from the first light beam 40a is retrodirectively collected by the lower collection lens 18, which focuses the return light onto first detector 36 bypassing the fold mirror 19. Return light from the second light beam 40b is 120; retrodirectively collected by upper collection lens 26, which focuses the return light onto second detector 38 bypassing the fold mirror 42. The detectors 36, 38 detect the return light and generate corresponding electrical signals that are processed by a processing system.

When it is desired to switch the multiple beam scanning system 10 of FIG. 1, or the multiple beam scanning system 10a of FIG. 2, to obtain cost savings, the scanners 10, 10a can be converted into single beam optical scanning systems.

Figure 3:
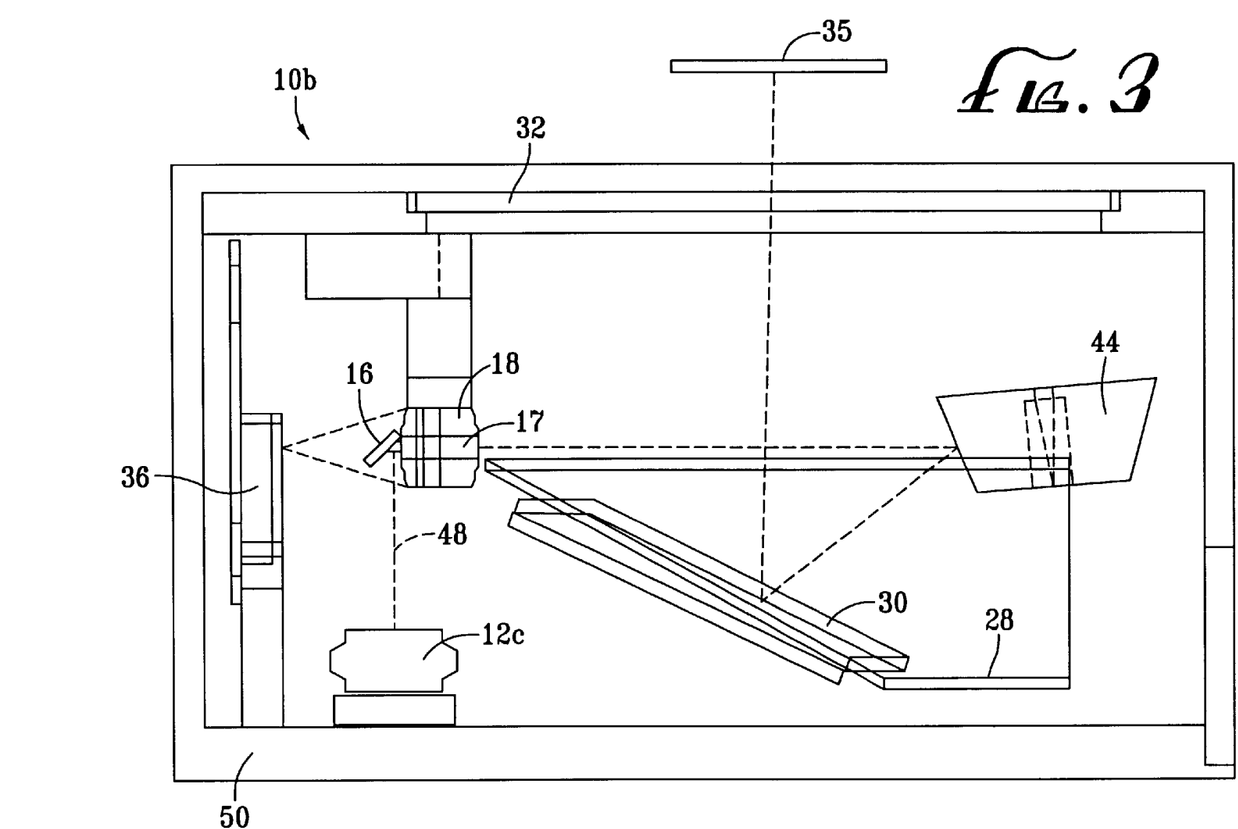
FIG. 3 is a diagrammatic view of a single beam scanning system according to a third embodiment.

FIG. 3 illustrates an embodiment of a single beam scanning system 10b. The multiple beam system 10 of FIG. 1 is converted to the single beam system 10b of FIG. 3 by removing components associated with the multiple beam system 10 from the scanner housing 50 and adding components suitable for the single beam system 10b. A preferred method of converting comprises the steps of: (1) removing the scanning mechanism 20; (2) installing a smaller scanning mechanism 44, such as a polygon mirror with shorter facets; (3) removing the collection lens 26 with the fold mirror 22 attached thereto; (4) removing the beam splitter 16; (5) removing the detector 38; (6) installing a fold mirror 19 adjacent collection lens 18 (in place of the beam splitter 16); (7) adjusting a decoder in the processing system for processing data associated with a single beam system; (8) changing laser power so that it is suitable for the single beam system, either by adjusting laser power in a laser driver or by replacing the light source 12 with a less powerful light source 12c. One or several of these steps may be omitted depending on the degree of cost savings that is desired, though eliminating certain steps may impact performance.

The multiple beam scanning system 10a of FIG. 2 is converted to the single beam scanning system 10b of FIG. 3 by removing components associated with the multiple beam system 10a from the scanner housing 50 and adding components suitable for the single beam system 10b. A preferred method of converting comprises the steps of: (1) removing the scanning mechanism 20; (2) installing a smaller scanning mechanism 44, such as a polygon mirror with shorter facets; (3) removing the collection lens 26 with the fold mirror 42 attached thereto; (4) removing the second light source 12b; (5) removing the detector 38; (6) adjusting a decoder in the processing system for processing data associated with a single beam system; (7) changing laser power so that it is suitable for the single beam system, either by adjusting laser power in a laser driver or by replacing the light source 12a with light source 12c. One or several of these steps may be omitted depending on the degree of cost savings that is desired, though eliminating certain steps may impact fit performance.

In the single beam scanning system 10b of FIG. 3, a light source 12c, such as a visible laser diode (VLD), produces a light beam 48 which is directed onto fold mirror 19. Fold mirror 19 reflects the light beam 48 through a channel 17 in collection lens 18 and onto scanning mechanism 44, such as a polygon mirror. The scanning mechanism 44 scans the light beam 48 across a plurality of pattern mirrors 28, 30 which direct the light beam 48 out through window 32 and onto a target 35. Return light from light beam 48 is retrodirectively collected by collection lens 18, which focuses the return light onto detector 36 bypassing the fold mirror 19. The detector 36 detects the return light and generates a corresponding electrical signal that is processed by a processing system.

When it is desired to switch the single beam scanning system 10b to a higher density scan pattern for a given application, the scanner 10b of FIG. 3 can be converted into a multiple beam optical scanning system.

The single beam scanning system 10b of FIG. 3 is converted to the multiple beam scanning system 10 of FIG. 1 by removing components associated with the single beam system 10b from the scanner housing 50 and adding components suitable for the multiple beam system 10. A preferred method of converting comprises the steps of: (1) removing the scanning mechanism 44; (2) installing a larger scanning mechanism 20, such as a polygon mirror with larger facets; (3) removing the fold mirror 19; (4) installing the beam splitter 16; (5) installing the collection lens 26 with fold mirror 22 attached thereto; (6) installing the detector 38; (7) adjusting a decoder in the processing system for processing data associated with a multiple beam system; (8) changing laser power so that it is suitable for the multiple beam system, either by adjusting laser power in a laser driver or by replacing light source 12c with more powerful light source 12. Certain of these steps may be omitted depending upon what components are already present in the system, though omission of some steps may impact performance.

The single beam scanning system 10b of FIG. 3 is converted to the multiple beam scanning system 10a of FIG. 2 by removing components associated with the single beam system 10b from the scanner housing 50 and adding components suitable for the multiple beam system 10a. A preferred method of converting comprises the steps of: (1) removing the scanning mechanism 44; (2) installing a larger scanning mechanism 20, such as a polygon mirror with larger facets; (3) installing the second laser source 12b; (4) installing the collection lens 26 with fold mirror 42 attached thereto; (5) installing the detector 38; (6) adjusting a decoder in the processing system for processing data associated with a multiple beam system; (7) changing laser power so that it is suitable for the multiple beam system, either by adjusting laser power in a laser driver or by replacing light source 12c with light source 12a. Certain of these steps may be omitted depending upon what components are already present in the system, though omission of some steps may impact performance.

Figure 4A:
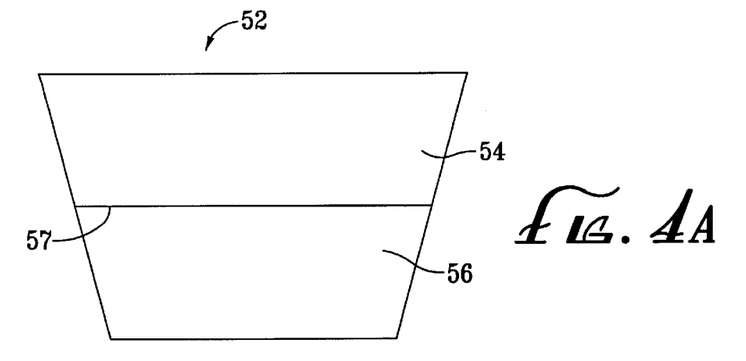
FIG. 4A is a side plan view of a polygon mirror according to a fourth embodiment.
Figure 4B:
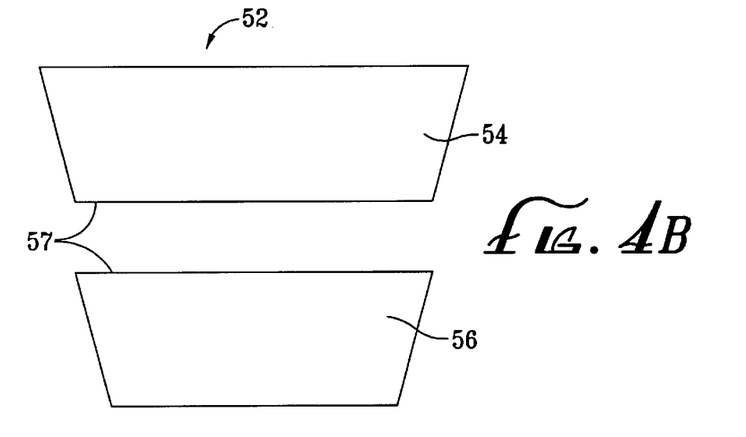
FIG. 4B is a side plan view of the polygon mirror of FIG. 4A separated into sections.
Figures 5A, 5B:
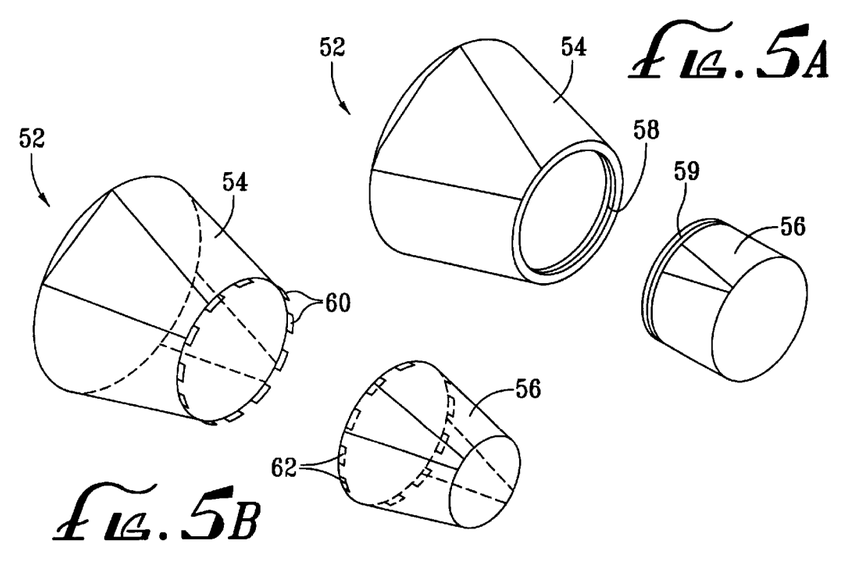
FIG. 5A is a perspective view of the polygon mirror of FIG. 4 according to one embodiment.
FIG. 5B is a perspective view of the polygon mirror of FIG. 4 according to a different embodiment.
Figure 6:
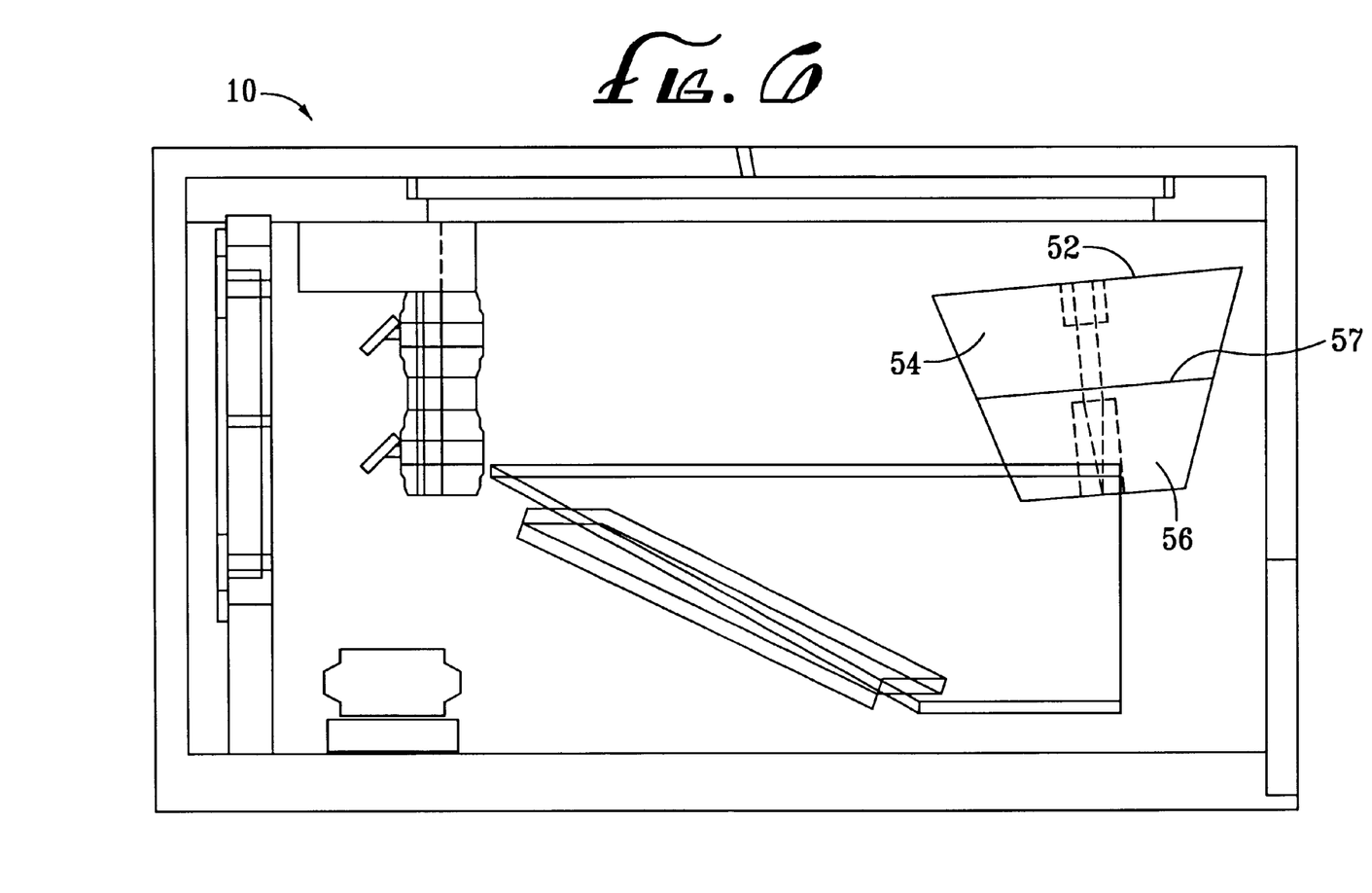
FIG. 6 is a diagrammatic view of the scanning system of FIG. 1 utilizing the polygon mirror of FIGS. 4–5.

FIGS. 4–6 illustrate an alternative polygon mirror 52 that can be utilized in both the multiple beam scanning systems 10, 10a of FIGS. 1–2, and in the single beam scanning system 10b of FIG. 3. The polygon mirror 52 is divided into a first section 54 and a second section 56. The facets of first section 54 may be oriented at the same or at a different angle than the facets of second section 56. When a multiple beam scanning system is employed, the two sections 54, 56 are attached to one another at an attachment section 57 as shown in FIG. 4A. The attachment section 57 may be threaded so that the sections 54, 56 screw together, it may have complementary tabs and slots so that the sections 54, 56 engage one another, or the sections 54, 56 may be attached to one another by any other suitable means. FIG. 5A illustrates attachment section 57 having threads 58, 59 that screw together. FIG. 5B illustrates attachment section 57 having tabs 60 and slots 62 that engage one another. When sections 54, 56 are attached to one another, the polygon mirror 52 is suitable for scanning multiple light beams.

When a single beam scanning system is employed, section 54 is detached from section 56 at attachment section 57, as shown in FIG. 4B, and section 54 is removed from the scanning system. Section 56 is suitable for scanning a single light beam. Accordingly, when converting between a multiple beam scanner and a single beam scanner, the convertible polygon mirror 52 can be utilized so that it is not necessary to replace the system scanning mechanism.

FIG. 6 illustrates the multiple beam scanning system 10 of FIG. 1 utilizing the polygon mirror 52 of FIGS. 4–5.

In a preferred embodiment, the attachments in scanning systems 10, 10a, 10b of FIGS. 1–3 can be performed by attaching the desired components to mounting supports, such as plastic brackets, which are fixed to the scanner housing 50.

Figure 7A:
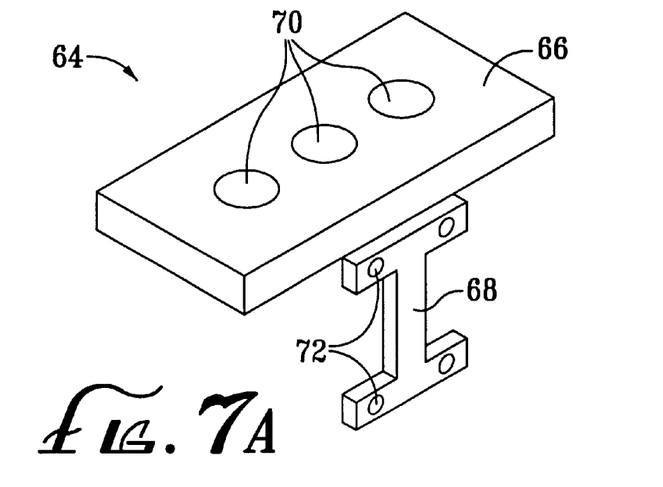
FIG. 7A is a perspective view of a preferred mounting bracket utilized in the scanning systems of FIGS. 1–3.
Figure 7B:
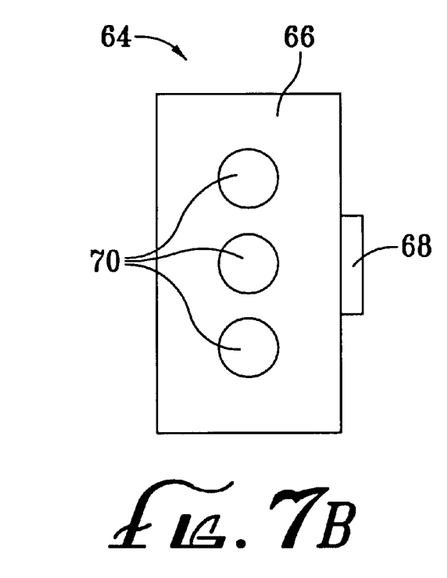
FIG. 7B is a top plan view of the mounting bracket of FIG. 7A.
Figure 7C:
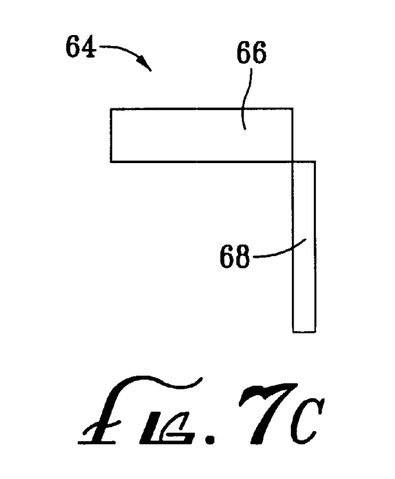
FIG. 7C is a side plan view of the mounting bracket of FIGS. 7A, 7B.
Figures 8A, 8B, 8C, 9:
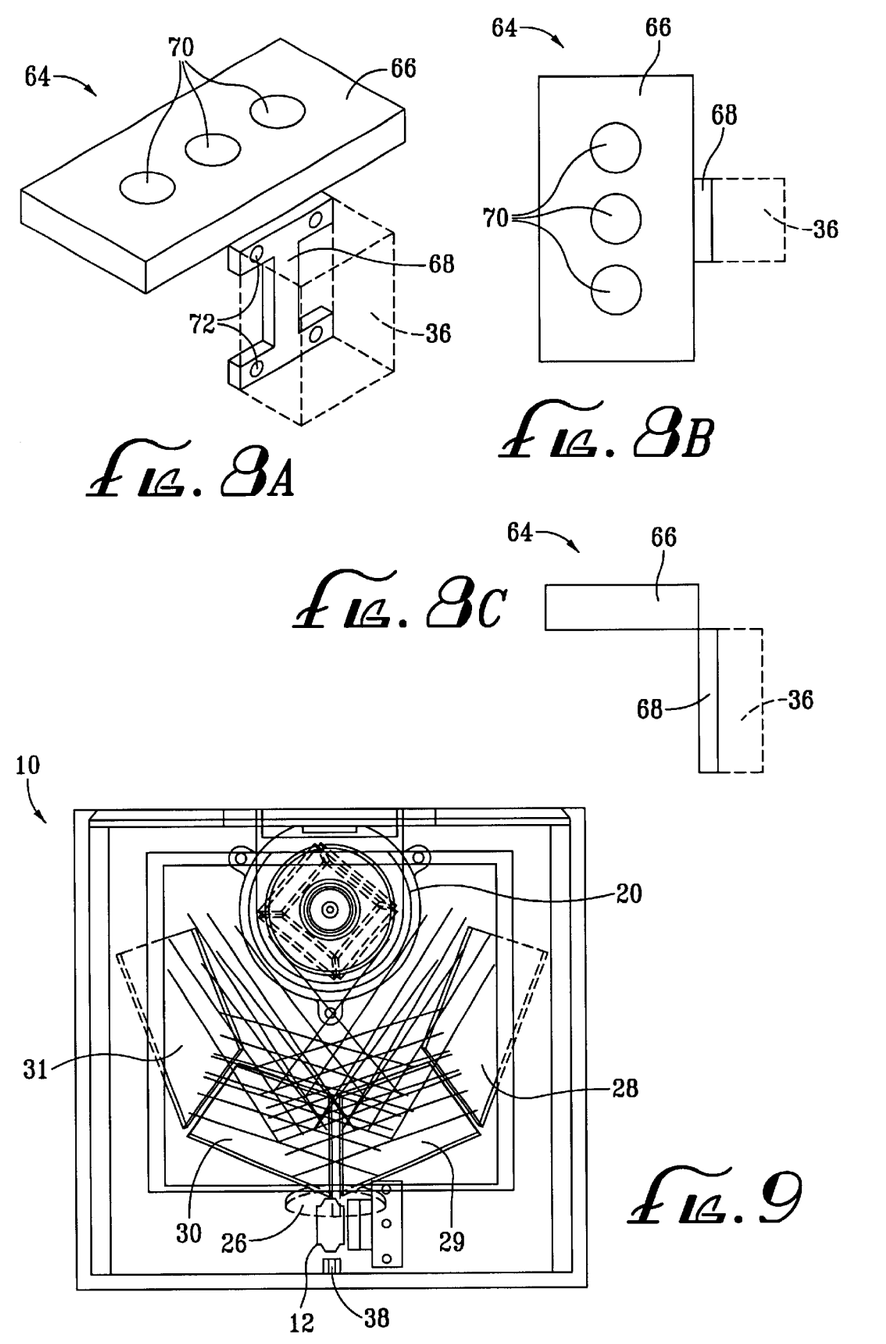
FIG. 8A is a perspective view of the mounting bracket of FIG. 7 attached to a detector.
FIG. 8B is a top plan view of the mounting bracket of FIG. 8A.
FIG. 8C is a side plan view of the mounting bracket of FIGS. 8A, 8B.
FIG. 9 is a top plan view of a preferred scanning system illustrating a scan pattern.

FIGS. 7–8 illustrate a preferred embodiment of a mounting support 64 that can be utilized in scanning systems 10, 10a, 10b of FIGS. 1–3. FIGS. 7A–7C illustrate a plastic bracket 64, onto which light sources, mirrors, detectors, collection lenses, and other scanner components can be mounted. The mounting support 64 includes a base 66 and a mounting bracket 68. The base 66 includes apertures 70 adapted to receive screws or any other fasteners suitable for securing the base 66 to a scanner housing. The mounting bracket 68 includes apertures 72 adapted to receive attachment portions of scanner components. In FIG. 7A, the mounting bracket 68 is shown in an "I" shape with four mounting apertures 72. The size and shape of the mounting bracket 68, as well as the number of apertures 72, however, can vary depending on the size, shape, and mounting characteristics of the scanner component being mounted thereon.

FIGS. 8A–8C illustrate the mounting support 64 of FIGS. 7A–7C with a detector 36 mounted thereon. The detector 36 includes outwardly extending portions that engage the apertures 72 on the mounting bracket 68, thereby securing the detector 36 to the mounting bracket 68. FIGS. 8A–8C illustrate only one possible configuration. The configuration of the mounting support 64 will vary according to the configuration and mounting characteristics of the scanner component being mounted thereon.

FIG. 9 is a top plan view of a preferred pattern mirror configuration for the multiple beam scanning system 10 of FIG. 1. The scanning mechanism, such as polygon mirror 20, scans light beams across pattern mirrors 28, 29, 30, 31, which then direct the light beams through a window and onto a target. The beams are then returned from the target and retrodirectively bounced off of pattern mirrors 28, 29, 30, 31 toward collection lens 26, which focuses the light beam onto detector 38. The second collection lens 18 is not visible in this view. FIG. 9 also illustrates a scan pattern generated by the multiple beam system 10. The pattern mirror configuration of FIG. 9 is also applicable to the multi-source multiple beam system 10a of FIG. 2 and the single beam system 10b of FIG. 3.

Figure 10:
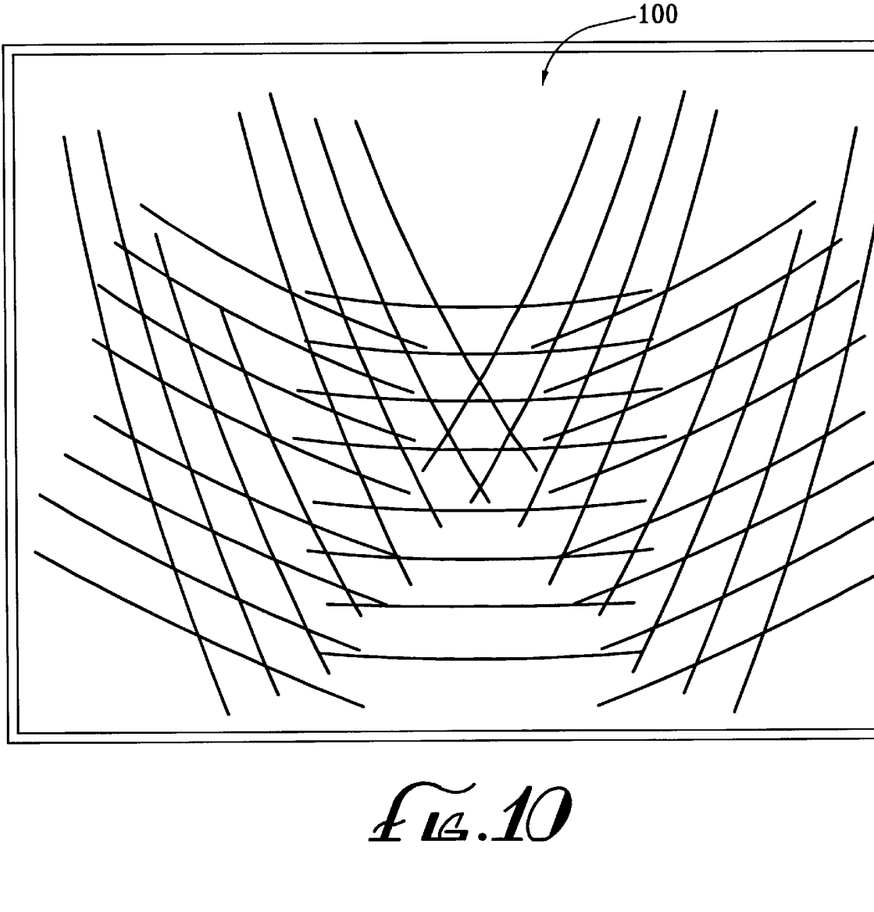
FIG. 10 is a schematic diagram of a scan pattern generated by the scanning systems of FIGS. 1–2.

FIG. 10 illustrates a scan pattern 100 such as may be produced by the dual beam optical scanning systems 10, 10a of FIGS. 1–2.

Figure 11:
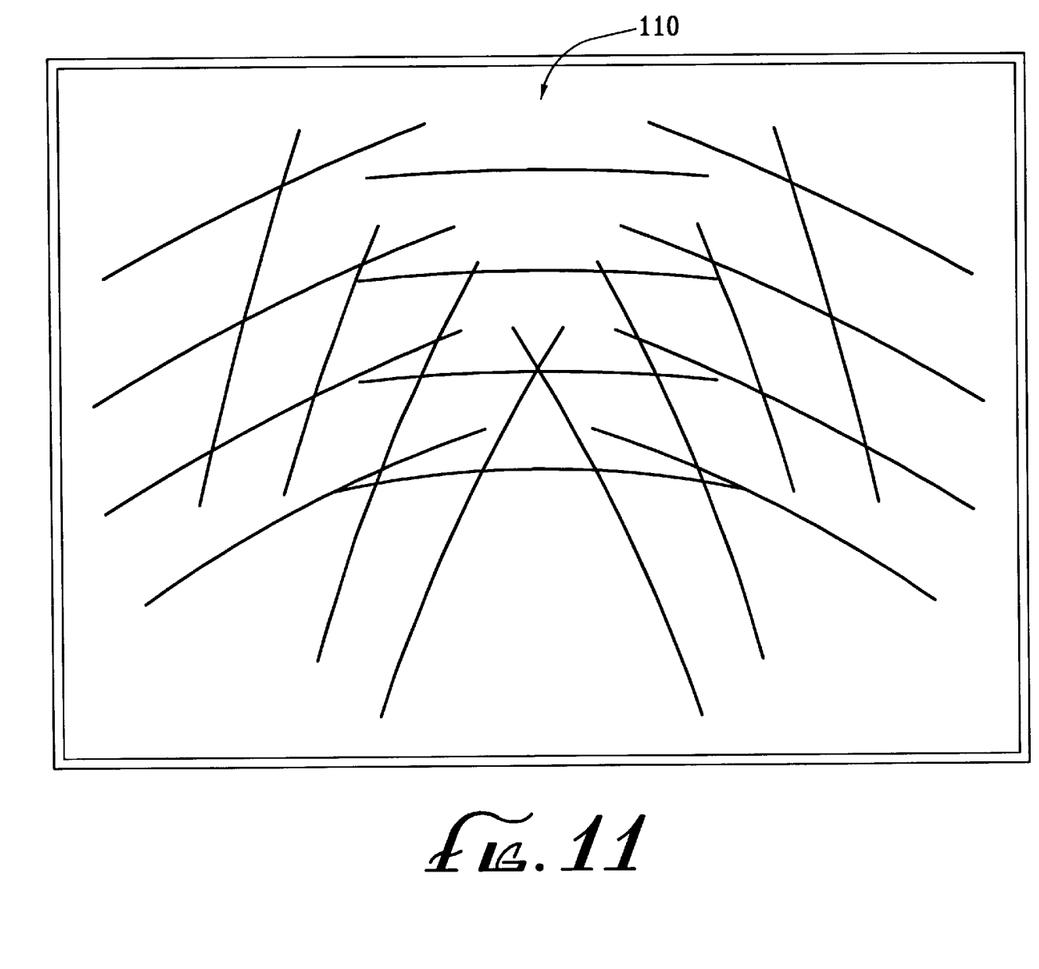
FIG. 11 is a schematic diagram of a scan pattern generated by the scanning system of FIG. 3.

FIG. 11 illustrates a scan pattern 110 such as may be produced by the single beam optical scanning system 10b of FIG. 3.

The above examples illustrate single beam and dual beam systems. The scanning system may, however, accommodate more than two beams and the corresponding components required for such multiple beam systems.

Thus while embodiments and applications of the present invention have been shown and described, it would be apparent to one skilled in the art that other modifications are possible without departing from the inventive concepts herein. The invention, therefore, is not to be restricted except in the spirit of the claims that follow.

What is claimed is:

1. In a multiple beam scanning system having a scanning mechanism which scans a first beam and a second beam, a method of converting the system comprising the steps of
    converting the scanning mechanism from a first configuration suitable for scanning multiple beams into a second configuration suitable for scanning a single beam;
    removing components associated with scanning the second beam;
    adjusting system decoding for processing data associated with a single beam system;
    adjusting laser power output suitable for a single beam system.

2. A method according to claim 1 wherein the step of converting the scanning mechanism comprises replacing a first polygon mirror with a second polygon mirror, said second polygon mirror having shorter facets than said first polygon mirror.

3. A method according to claim 1 wherein the step of converting the scanning mechanism comprises removing a top section of a polygon mirror, a bottom section of said polygon mirror suitable for scanning a single beam.

4. A method according to claim 1 wherein the step of removing components comprises removing one of a beam splitter and a light source.

5. A method according to claim 1 wherein the step of removing components comprises removing at least one of a collection lens, a fold mirror, and a detector.

6. A method according to claim 1 wherein the step of adjusting laser power output comprises replacing a first light source with a second light source, said second light source being less powerful than said first light source.

7. In a single beam scanning system having a housing body enclosing a scanning mechanism which scans a first beam, a method of converting the system comprising the steps of
    converting the scanning mechanism from a first configuration suitable for scanning a single beam into a second configuration suitable for scanning multiple beams;
    adding components to the housing body associated with scanning a second beam;
    adjusting system decoding for processing data associated with a multiple beam system;
    adjusting laser power output suitable for a multiple beam system.

8. A method according to claim 7 wherein the step of converting the scanning mechanism comprises replacing a first polygon mirror with a second polygon mirror, said second polygon mirror having longer larger facets than said first polygon mirror.

9. A method according to claim 7 wherein the step of converting the scanning mechanism comprises attaching a top section of a polygon mirror to a bottom section of said polygon mirror, said top section suitable for scanning the second beam.

10. A method according to claim 7 wherein the step of adding components comprises attaching one of a beam splitter and a light source to the housing body.

11. A method according to claim 7 wherein the step of adding components comprises attaching a t least one of a collection lens, a fold mirror, and a detector to the housing body.

12. A method according to claim 7 wherein the step of adjusting laser power output comprises replacing a first light source releasably affixed to the housing body with a second light source, said second light source being more powerful than said first light source.

13. A laser bar code scanning system which scans at least one beam comprising a housing body enclosing, at least partially, an interior;

a window positioned at one end of the housing body;

a first scanning mechanism releasably affixed to the interior of the housing body, the first scanning mechanism comprising a first configuration suitable for scanning multiple beams;

a second scanning mechanism which is readily interchangeable with the first scanning mechanism, the second scanning mechanism comprising a second configuration suitable for scanning a single beam;

a first set of scanning components affixed to the interior of the housing body, the first set of scanning components associated with scanning a first beam;

a second set of scanning components releasably affixed to the interior of the housing body, the second set of scanning components associated with scanning a second beam.

14. A scanning system according to claim 13 wherein the first scanning mechanism is a first polygon mirror and the second scanning mechanism is a second polygon mirror, the second polygon mirror having shorter facets than the first polygon mirror.

15. A scanning system according to claim 13 wherein the second set of scanning components comprise at least one of a collection lens, a fold mirror, a light source, a beam splitter, and a detector.

16. A scanning system according to claim 13 wherein the second set of scanning components are releasably affixed to the interior of the housing body via plastic mounting brackets.

17. A laser bar code scanning system which scans at least one beam comprising a housing body enclosing, at least partially, an interior;

a window positioned at one end of the housing body;

a scanning mechanism affixed to the interior of the housing body, the scanning mechanism having a top section and a bottom section, the top section releasably affixed to the bottom section, the bottom section suitable for scanning a first beam, the top section suitable for scanning a second beam;

a first set of scanning components affixed to the interior of the housing body, the first set of scanning components associated with scanning the first beam;

a second set of scanning components releasably affixed to the interior of the housing body, the second set of scanning components associated with scanning the second beam.

18. A scanning system according to claim 17 wherein the scanning mechanism is a polygon mirror, the polygon mirror detachable into the top section and the bottom section, the top section and the bottom section having facets.

19. A scanning system according to claim 18 wherein the facets of the top section are oriented at a different angle than the facets of the bottom section.

20. A scanning system according to claim 17 wherein the second set of scanning components comprise at least one of a collection lens, a fold mirror, a light source, a beam splitter, and a detector.

21. A scanning system according to claim 17 wherein the second set of scanning components are releasably affixed to the interior of the housing body via plastic mounting brackets.

22. A method of scanning an item in a scan volume with a laser bar code scanner comprising the steps of generating at least one light beam from one of a single beam source and a multiple beam source along an outgoing beam path;

locating one of a first scanning mechanism and a second scanning mechanism in the outgoing beam path, the first scanning mechanism comprising a first configuration suitable for scanning a single light beam, the second scanning mechanism comprising a second configuration suitable for scanning multiple light beams, the first scanning mechanism and the second scanning mechanism readily interchangeable with one another;

scanning the at least one light beam with one of the first and second scanning mechanisms toward a target;

collecting return light from the target onto at least one detector.

23. A method according to claim 22 further comprising scanning the at least one light beam with a polygon mirror, said polygon mirror including a bottom section and a removable top section, the bottom section suitable for scanning a first beam, the removable top section suitable for scanning a second beam.

24. A method according to claim 22 further comprising generating a laser beam and splitting the laser beam with a beam splitter to generate multiple light beams.

25. A method according to claim 22 further comprising generating a first light beam with a first laser diode and generating a second light beam with a second laser diode.

* * * * *